(12) United States Patent
Miyashita et al.

(10) Patent No.: US 12,483,670 B2
(45) Date of Patent: Nov. 25, 2025

(54) INFORMATION PROCESSING DEVICE, PROGRAM, AND PATTERN CODE

(71) Applicant: THE UNIVERSITY OF TOKYO, Tokyo (JP)

(72) Inventors: Leo Miyashita, Tokyo (JP); Satoshi Tabata, Tokyo (JP); Masatoshi Ishikawa, Tokyo (JP)

(73) Assignee: THE UNIVERSITY OF TOKYO (JP)

( * ) Notice: Subject to any disclaimer, the term of this patent is extended or adjusted under 35 U.S.C. 154(b) by 0 days.

(21) Appl. No.: 18/681,698

(22) PCT Filed: Jul. 28, 2022

(86) PCT No.: PCT/JP2022/029129
§ 371 (c)(1),
(2) Date: Feb. 6, 2024

(87) PCT Pub. No.: WO2023/017740
PCT Pub. Date: Feb. 16, 2023

(65) Prior Publication Data
US 2024/0406343 A1    Dec. 5, 2024

(30) Foreign Application Priority Data

Aug. 13, 2021    (JP) .................................. 2021-132060

(51) Int. Cl.
*H04N 5/74*        (2006.01)
*G06T 5/80*        (2024.01)
*G06T 11/60*       (2006.01)

(52) U.S. Cl.
CPC .................. *H04N 5/74* (2013.01); *G06T 5/80* (2024.01); *G06T 11/60* (2013.01)

(58) Field of Classification Search
CPC .. G06T 5/80; G06T 7/50; G06T 11/60; H04N 5/74
See application file for complete search history.

(56) References Cited

U.S. PATENT DOCUMENTS 4,439,157 A * 3/1984 Breglia .............. G02B 27/0172
                                                    359/618
6,543,899 B2 * 4/2003 Covannon ............ G02B 27/017
                                                    353/11
(Continued)

FOREIGN PATENT DOCUMENTS

JP    2006-162639 A    6/2006
JP    5547227 B2       7/2014
(Continued)

OTHER PUBLICATIONS

International Search Report of the International Searching Authority, issued in PCT/JP2022/029129, mailed Oct. 18, 2022; ISA/JP (5 pages).

(Continued)

*Primary Examiner* — Michael B. Pierorazio
(74) *Attorney, Agent, or Firm* — Harness, Dickey & Pierce, P.L.C.

(57) ABSTRACT

[Problem] To provide an information processing device, program, and pattern code that make it possible to quickly specify a position in a pattern.
[Solution] In one embodiment of this invention, an information processing device is provided. The information processing device comprises a projection image generation unit, a decryption unit, and a phase specification unit. The projection image generation unit is configured so as to be capable of generating a projection image on the basis of predetermined pattern information and outputting the generated projection image to a projection device. The projection image comprises a clock pattern and a data pattern based on pattern information. The decryption unit is configured so as to be capable of decrypting the data pattern into values on the basis of a captured image obtained by imaging an object using an imaging device. The captured image is an image obtained by photographing the object when the pro- (Continued)

jection image is being projected thereon by the projection device. The phase specification unit is configured so as to be capable of specifying the phases of each part of the object on the basis of the values and pattern information.

17 Claims, 23 Drawing Sheets

(56) References Cited

U.S. PATENT DOCUMENTS

| | | | | |
|---|---|---|---|---|
| 6,652,104 B2* | 11/2003 | Nishida | ............... | H04N 9/3185 353/69 |
| 6,877,863 B2* | 4/2005 | Wood | ............... | H04N 9/3185 353/42 |
| 7,070,283 B2* | 7/2006 | Akutsu | ............... | H04N 5/74 353/30 |
| 7,119,965 B1* | 10/2006 | Rolland | ............... | G02B 27/0172 359/630 |
| 7,182,466 B2* | 2/2007 | Sunaga | ............... | H04N 5/74 353/69 |
| 7,270,421 B2* | 9/2007 | Shinozaki | ............ | G03B 21/142 353/121 |
| 7,359,575 B2* | 4/2008 | Bassi | ............... | G06T 3/18 345/427 |
| 7,441,906 B1* | 10/2008 | Wang | ............... | G03B 21/14 353/121 |
| 7,782,387 B2* | 8/2010 | Azuma | ............... | H04N 25/68 359/662 |
| 8,676,427 B1* | 3/2014 | Ferguson | ............ | G08G 1/0965 701/23 |
| 9,392,262 B2* | 7/2016 | Dal Mutto | ............ | H04N 23/61 |
| 9,753,126 B2* | 9/2017 | Smits | ............... | G01S 17/003 |
| 9,810,913 B2* | 11/2017 | Smits | ............... | G02B 5/124 |
| 10,067,230 B2* | 9/2018 | Smits | ............... | G01S 17/86 |
| 10,261,183 B2* | 4/2019 | Smits | ............... | G01S 7/4868 |
| 10,379,220 B1* | 8/2019 | Smits | ............... | G01S 7/4811 |
| 10,394,112 B2* | 8/2019 | Johnson | ............ | A01M 1/223 |
| 10,473,921 B2* | 11/2019 | Smits | ............... | G01S 17/87 |
| 10,591,605 B2* | 3/2020 | Smits | ............... | G01S 17/42 |
| 10,663,626 B2* | 5/2020 | Benitez | ............... | G02B 27/01 |
| 11,830,455 B2* | 11/2023 | Schriever | ............ | G06F 3/16 |
| 2002/0051095 A1* | 5/2002 | Su | ............... | H04N 9/3194 348/745 |
| 2002/0067466 A1* | 6/2002 | Covannon | ............ | G02B 30/26 353/8 |
| 2002/0122161 A1* | 9/2002 | Nishida | ............... | H04N 9/3194 353/70 |
| 2003/0191836 A1* | 10/2003 | Murtha | ............... | H04L 67/02 709/224 |
| 2003/0210381 A1* | 11/2003 | Itaki | ............... | H04N 5/74 353/70 |
| 2004/0156024 A1* | 8/2004 | Matsuda | ............ | H04N 9/3185 353/70 |
| 2005/0046803 A1* | 3/2005 | Akutsu | ............... | H04N 5/74 353/69 |
| 2005/0073661 A1* | 4/2005 | Tamura | ............... | H04N 9/3194 353/70 |
| 2005/0151934 A1* | 7/2005 | Akutsu | ............... | G03B 21/147 353/69 |
| 2005/0237492 A1* | 10/2005 | Shinozaki | ............ | H04N 9/3185 353/69 |
| 2006/0098167 A1* | 5/2006 | Sato | ............... | G03B 21/26 353/35 |
| 2006/0203207 A1* | 9/2006 | Ikeda | ............... | H04N 9/3185 353/70 |
| 2007/0008344 A1* | 1/2007 | Medina | ............... | G06T 15/10 345/647 |
| 2007/0257941 A1* | 11/2007 | Plut | ............... | G06F 9/451 345/660 |
| 2007/0285626 A1* | 12/2007 | Miyasaka | ............ | G03B 21/206 353/85 |
| 2009/0278999 A1* | 11/2009 | Ofune | ............... | H04N 21/47 348/E3.048 |
| 2010/0002123 A1* | 1/2010 | Nozaki | ............... | H04N 23/00 348/E5.022 |
| 2010/0045942 A1* | 2/2010 | Furui | ............... | H04N 9/3194 353/69 |
| 2011/0085044 A1* | 4/2011 | Noda | ............... | G03B 21/58 348/E5.133 |
| 2011/0210979 A1* | 9/2011 | Furui | ............... | G03B 37/04 345/619 |
| 2011/0234994 A1* | 9/2011 | Uchiyama | ............ | H04N 9/3185 353/121 |
| 2011/0285971 A1* | 11/2011 | Oka | ............... | H04N 9/3185 353/70 |
| 2011/0292351 A1* | 12/2011 | Ishii | ............... | H04N 9/3185 353/69 |
| 2013/0245877 A1* | 9/2013 | Ferguson | ............ | G05D 1/249 701/23 |
| 2014/0303827 A1* | 10/2014 | Dolgov | ............... | B60W 30/00 701/23 |
| 2015/0094897 A1* | 4/2015 | Cuddihy | ............... | B60K 35/81 701/23 |
| 2015/0336502 A1* | 11/2015 | Hillis | ............... | G05D 1/0088 701/23 |
| 2017/0240096 A1* | 8/2017 | Ross | ............... | G05D 1/0212 |
| 2018/0046835 A1 | 2/2018 | Hong et al. | | |
| 2018/0158102 A1* | 6/2018 | Choi | ............... | G06Q 30/0251 |
| 2019/0266693 A1* | 8/2019 | Wiseman | ............ | G02B 7/09 |
| 2019/0308320 A1* | 10/2019 | Konishi | ............... | G06V 20/64 |
| 2020/0174130 A1* | 6/2020 | Banerjee | ............ | B60R 11/04 |
| 2020/0213533 A1* | 7/2020 | Zhang | ............... | G06T 7/174 |
| 2020/0372625 A1* | 11/2020 | Dal Mutto | ............ | G06F 18/254 |
| 2021/0004610 A1* | 1/2021 | Huang | ............... | G01S 17/10 |
| 2021/0168440 A1* | 6/2021 | Ho | ............... | H04N 21/43632 |
| 2021/0310823 A1* | 10/2021 | Wilbers | ............ | G01C 21/3811 |
| 2021/0341310 A1* | 11/2021 | Wilbers | ............... | G01C 21/26 |
| 2021/0356572 A1* | 11/2021 | Kadambi | ............ | G06V 20/64 |
| 2022/0171412 A1* | 6/2022 | Cui | ............... | G08B 3/10 |
| 2022/0201262 A1* | 6/2022 | Chen | ............... | H04N 9/3185 |
| 2022/0242430 A1* | 8/2022 | Watano | ............... | B60W 50/10 |
| 2023/0010713 A1* | 1/2023 | Park | ............... | G01S 17/88 |

FOREIGN PATENT DOCUMENTS

| | | |
|---|---|---|
| JP | 2014-199193 A | 10/2014 |
| JP | 2014-235063 A | 12/2014 |
| JP | 2018-025531 A | 2/2018 |
| JP | 2018-520339 A | 7/2018 |
| JP | 2020-180948 A | 11/2020 |

OTHER PUBLICATIONS

Dennis Schusselbauer, et al. "Dothraki: Tracking Tangibles Atop Tabletops Through De-Bruijn Tori"; TEI '21; Feb. 14-17, 2021 (total 12 pages).

Office Action issued in the corresponding Japanese Patent Application No. 2023-541402; mailed on Aug. 5, 2025 (total 18 pages).

* cited by examiner

FIG. 11

| A | B | C | D | E | F | G | H | I | J |
|---|---|---|---|---|---|---|---|---|---|
| 1 | 0 | 1 | 0 | 1 | 0 | 1 | 0 | 1 | 0 |
| a | b | c | d | e | f | g | h | i | j |
| 1 | 0 | 1 | 0 | 1 | 0 | 1 | 0 | 1 | 0 |
| A | B | C | D | E | F | G | H | I | J |

| A | B | C | D | E | F | G | H | I | J |
|---|---|---|---|---|---|---|---|---|---|
| 1 | 0 | 1 | 0 | 1 | 0 | 1 | 0 | 1 | 0 |
| a | b | c | d | e | f | g | h | i | j |
| 1 | 0 | 1 | 0 | 1 | 0 | 1 | 0 | 1 | 0 |
| A | B | C | D | E | F | G | H | I | J |

B21

P

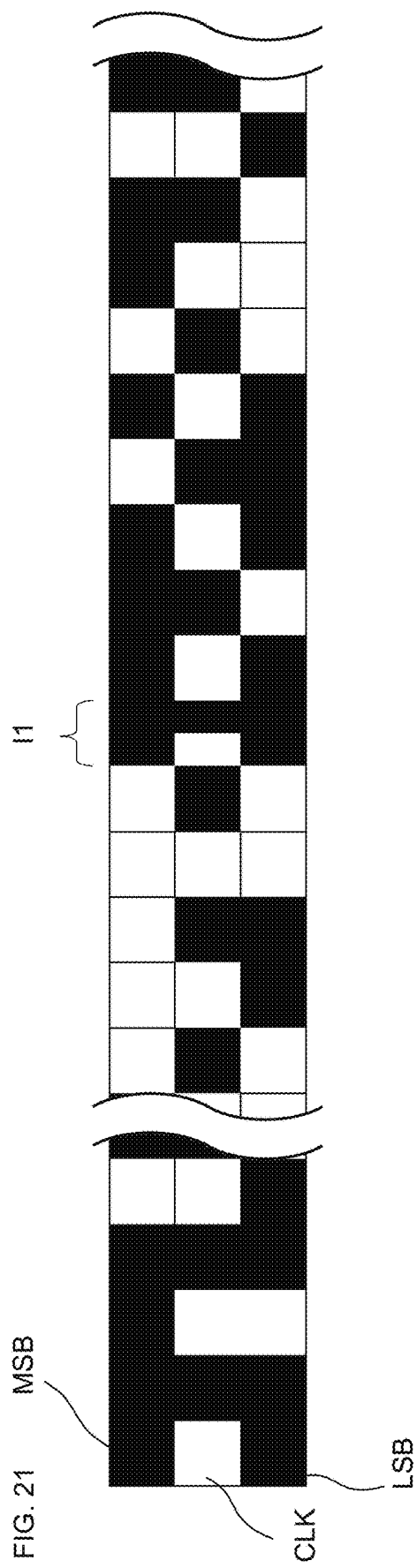

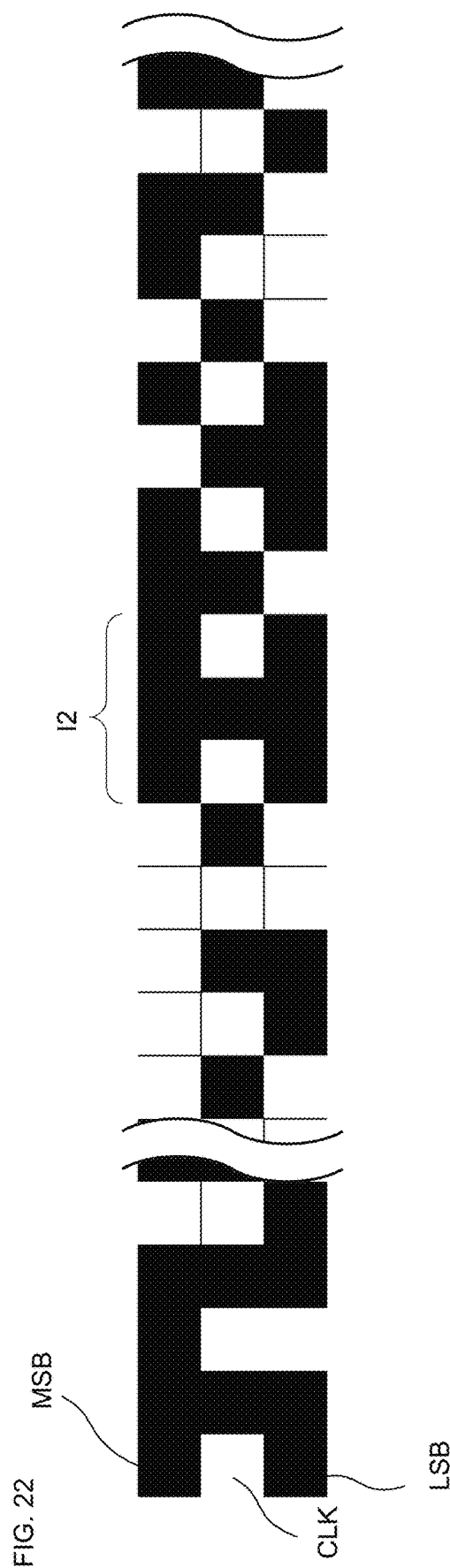

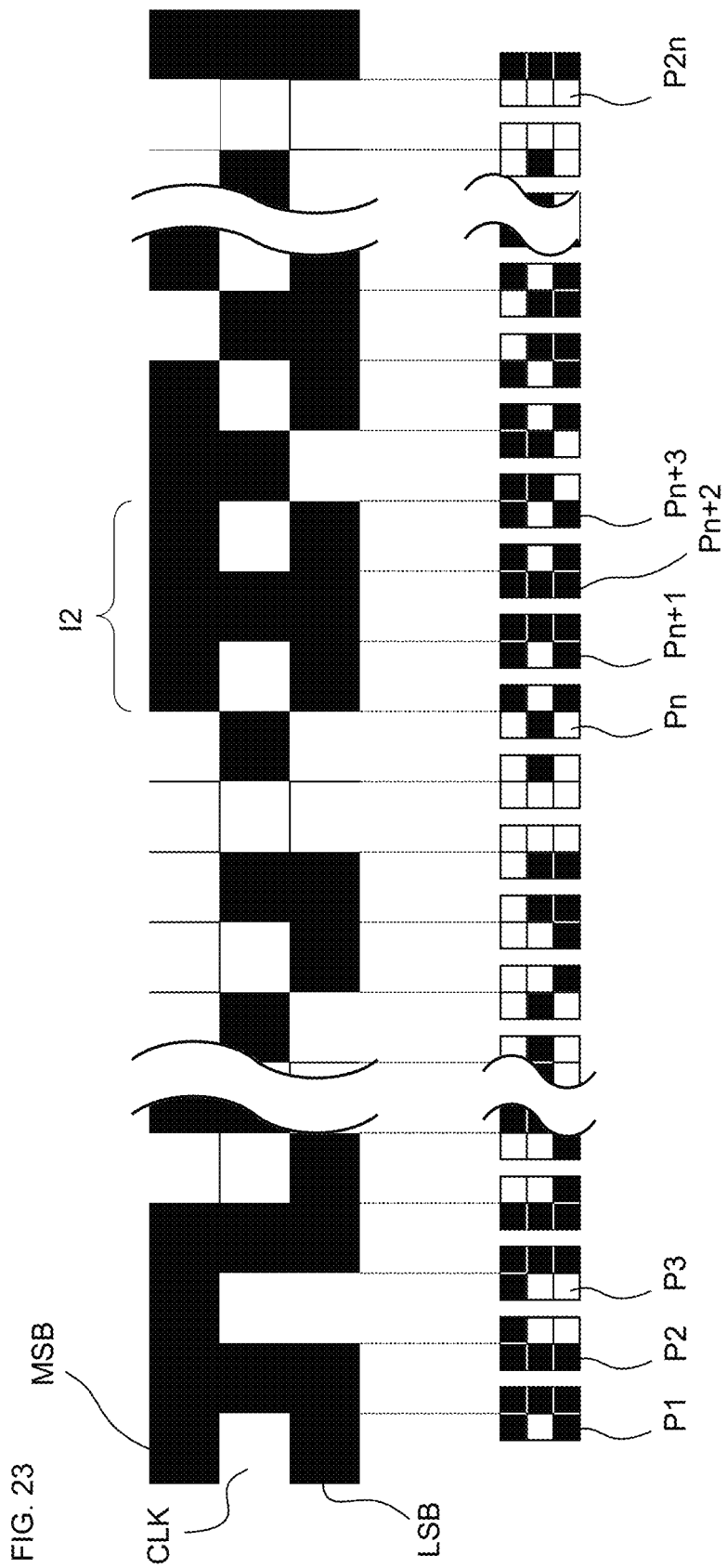

INFORMATION PROCESSING DEVICE, PROGRAM, AND PATTERN CODE

BACKGROUND

The present invention relates to an information processing apparatus, a program and a pattern code.

RELATED ART

Structured light is used when measuring distance to each point on a surface of an object. Structured light is a pattern of light projected onto an object, and is referred to as PN sequence, M sequence, De Bruijn sequence, etc. Note that technique using the De Bruijn sequence includes those described in Patent Document 1.

PRIOR ART DOCUMENTS

Patent Document

[Patent document 1] JP 5547227 B2

SUMMARY

Problems to be Solved by Invention

However, when measuring distance using structured light, it is necessary to take an image of an object on which a pattern of structured light is projected and specify which part of the pattern is a point in the captured image. Therefore, it is desired to speed up this specification process.

In view of the above circumstances, the present invention provides an information processing apparatus, a program, and a pattern code capable of specifying position in a pattern at high speed.

Means for Solving Problems

According to an aspect of the present invention, an information processing apparatus is provided. The information processing apparatus comprises a projection image generation unit, a decoding unit, and a phase specification unit. The projection image generation unit is configured to generate a projection image based on predetermined pattern information and output the generated projection image to a projection apparatus. The projection image includes a clock pattern and a data pattern based on the pattern information. The decoding unit is configured to decode the data pattern into a value based on a captured image taken of an object by an imaging apparatus. The captured image is an image taken of the object in a state where the projection image is projected by the projection apparatus. The phase specification unit is configured to specify phase of each part of the object based on the value and the pattern information.

According to an aspect of the present invention, it is possible to specify position of each point of an object at high speed.

BRIEF DESCRIPTION OF DRAWINGS

FIG. 11 is a diagram for illustrating decoding from a pattern P.

Figure 12:
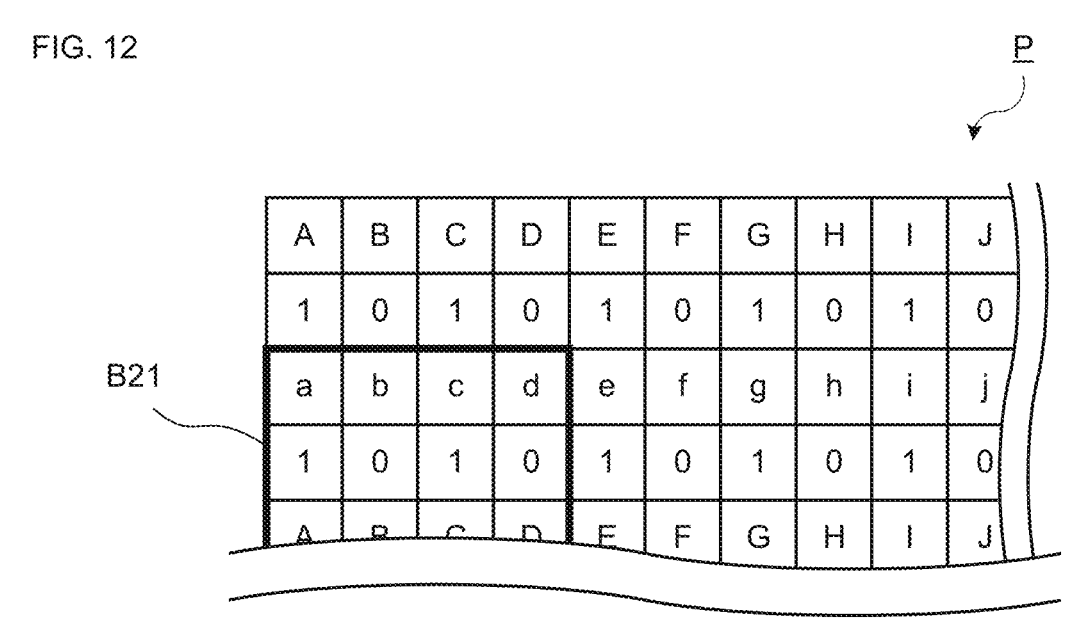

FIG. 12 is a diagram for illustrating decoding from a pattern P.

FIG. 21 is a diagram showing an example of a pattern including clock inversion.

FIG. 22 is a diagram showing an example of a pattern including clock inversion.

FIG. 23 is a diagram for illustrating details of a pattern including clock inversion.

DETAILED DESCRIPTION

Hereinafter, embodiment of the present invention will be described with reference to the drawings. Various features described in the embodiment below can be combined with each other.

A program for realizing a software in the present embodiment may be provided as a non-transitory computer readable medium that can be read by a computer or may be provided for download from an external server or may be provided so that the program can be activated on an external computer to realize functions thereof on a client terminal (so-called cloud computing).

In the present embodiment, the "unit" may include, for instance, a combination of hardware resources implemented by a circuit in a broad sense and information processing of software that can be concretely realized by these hardware resources. Further, various information is performed in the present embodiment, and the information can be represented by, for instance, physical values of signal values representing voltage and current, high and low signal values as a set of binary bits consisting of 0 or 1, or quantum superposition (so-called qubits), and communication/calculation can be executed on a circuit in a broad sense.

Further, the circuit in a broad sense is a circuit realized by combining at least an appropriate number of a circuit, a circuitry, a processor, a memory, or the like. In other words, it is a circuit includes application specific integrated circuit (ASIC), programmable logic device (e.g., simple programmable logic device (SPLD), complex programmable logic device (CPLD), field programmable gate array (FPGA)), or the like.

1. Overall Configuration

Figure 1:
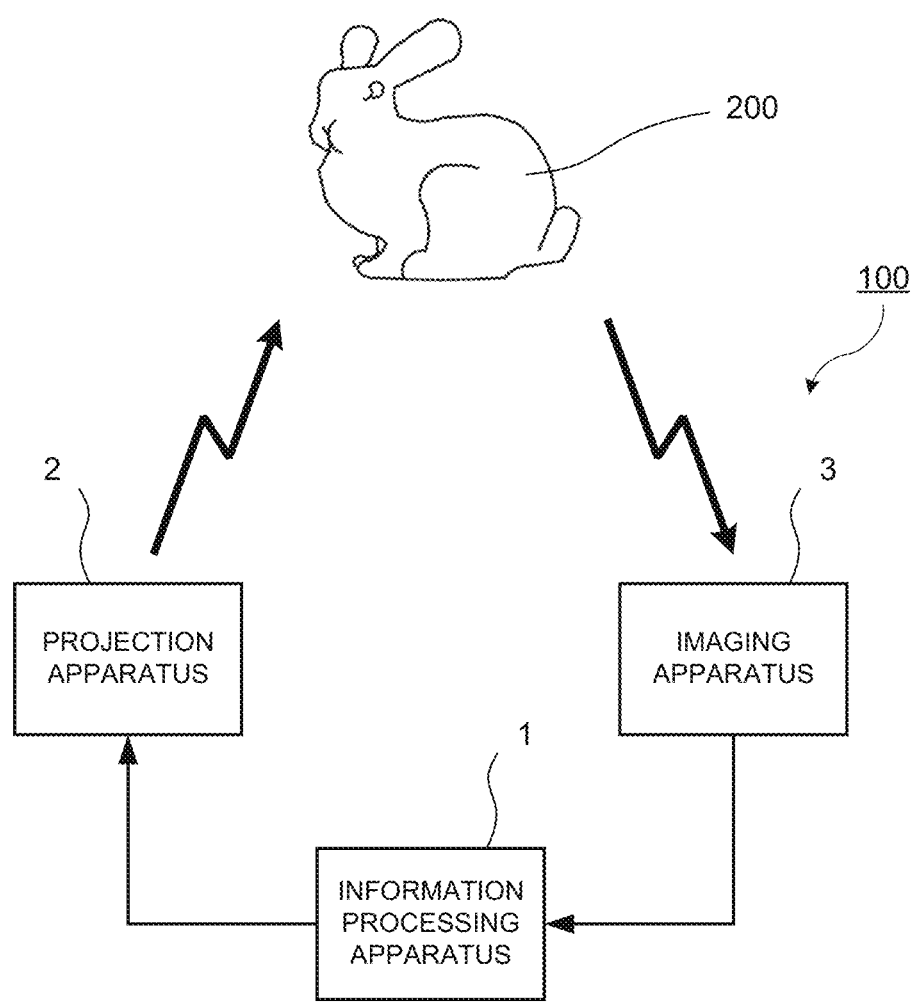
FIG. 1 is a diagram showing an arrangement example of an information processing apparatus 1 according to an embodiment of the present invention.

FIG. 1 is a diagram showing an arrangement example of an information processing apparatus 1 according to an embodiment of the present invention. As shown in the figure, the information processing apparatus 1 is connected to a projection apparatus 2 and an imaging apparatus 3 to configure a system 100. The system 100 is configured to scan shape of an object 200 by measuring distance to each part of the object 200.

The information processing apparatus 1 is configured to allow the projection apparatus 2 to project a predetermined pattern and process an image captured by the imaging apparatus 3 to specify shape of the object 200.

The projection apparatus 2 is configured to project a pattern output by the information processing apparatus 1 onto the object 200, and is, for instance, a projector.

The imaging apparatus 3 is a camera, for example, that captures image of the object 200 on which a pattern is projected by the projection apparatus 2. The camera may capture still image or may capture moving image. When capturing moving image of the object 200, a part thereof, for example, one frame, is used as a still image. Of course, a high-speed camera capable of capturing at a high frame rate may be applied.

2. Configuration of Information Processing Apparatus

Figure 2:
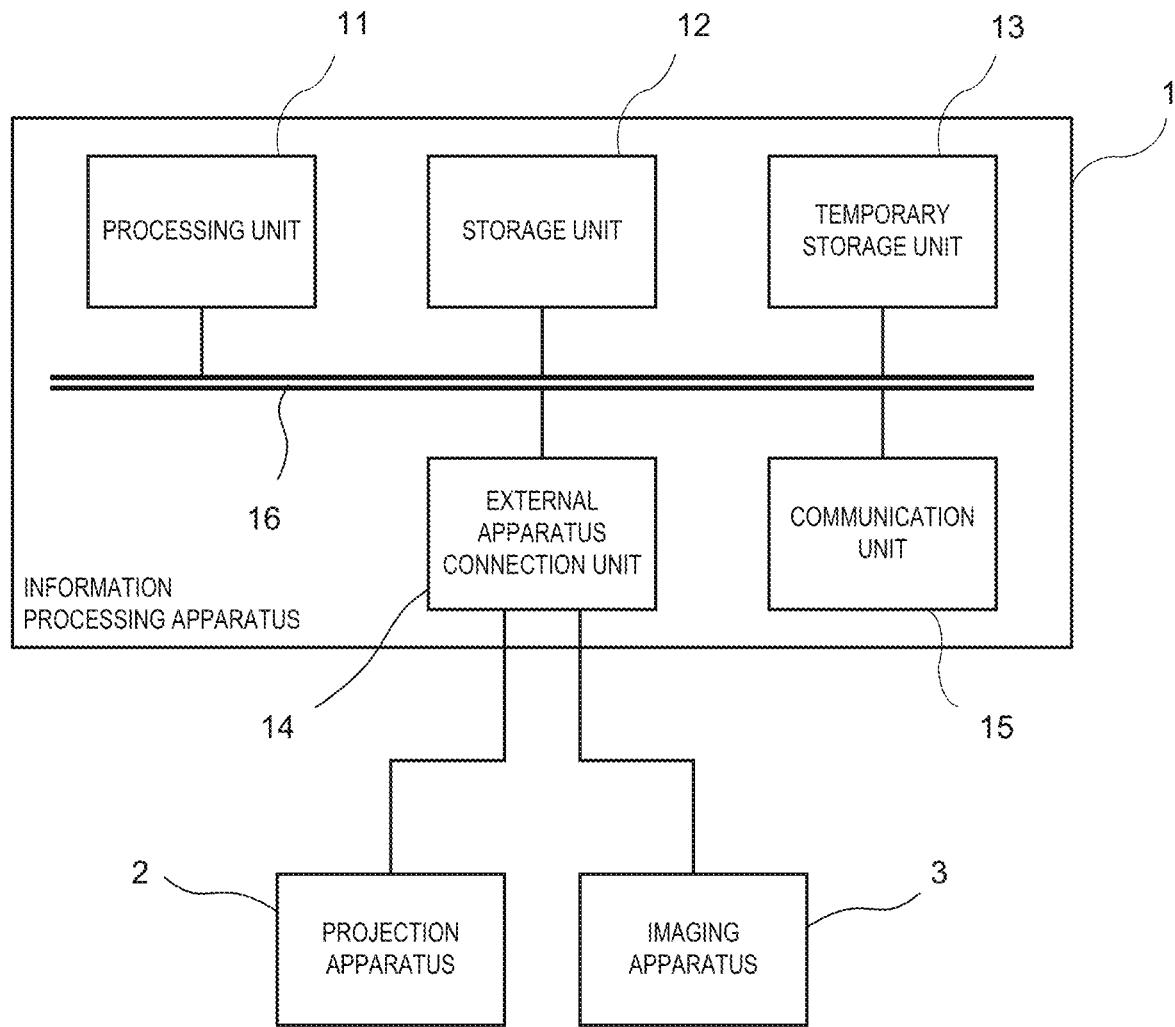
FIG. 2 is a diagram showing a configuration of an information processing apparatus 1.

Subsequently, a configuration of the information processing apparatus 1 will be described. FIG. 2 is a diagram showing the configuration of the information processing apparatus 1. As shown in the figure, the information processing apparatus 1 comprises a processing unit 11, a storage unit 12, a temporary storage unit 13, an external apparatus connection unit 14, and a communication unit 15, and these components are electrically connected via communication bus 16 within the information processing apparatus 1.

The processing unit 11 is realized by, for instance, a central processing unit (CPU), and operates according to a predetermined program stored in the storage unit 12 to realize various functions.

The storage unit 12 is a nonvolatile storage medium that stores various information. This may be realized, for example, by a storage device such as a hard disk drive (HDD) or a solid state drive (SSD). The storage unit 12 may be arranged in another device that communicable with the information processing apparatus 1.

The temporary storage unit 13 is a volatile storage medium. It is realized by a memory such as a random access memory (RAM), for instance, and temporarily stores necessary information (argument, array, etc.) when the processing unit 11 operates.

The external apparatus connection unit 14 is a connection unit that conforms to standard such as universal serial bus (USB) or high-definition multimedia interface (HDMI (registered trademark)) and allows connection of input apparatus such as a keyboard and display apparatus such as a monitor. Further, the projection apparatus 2 and the imaging apparatus 3 are connected to the external apparatus connection unit 14.

The communication unit 15 is a communication means that conforms to the local area network (LAN) standard, for example, and realizes communication between the information processing apparatus 1 and a network such as a local area network or the Internet therethrough.

A computer such as personal computer may be used as the information processing apparatus 1, and the information processing apparatus 1 can be configured by using two or more computers.

3. Function of Information Processing Apparatus 1

Next, function of the information processing apparatus 1 will be described. The information processing apparatus 1 allows a predetermined pattern to be projected from the projection apparatus 2 and processing an image captured by the imaging apparatus 3 to specify shape of the object 200, and operates according to a program to realize each functional unit described below. The program is a program that allows a computer to operate or function as an information processing apparatus. The object 200 may be a stationary object, or may be an object that involves motion, for example, a robot or a living organism.

Figure 3:
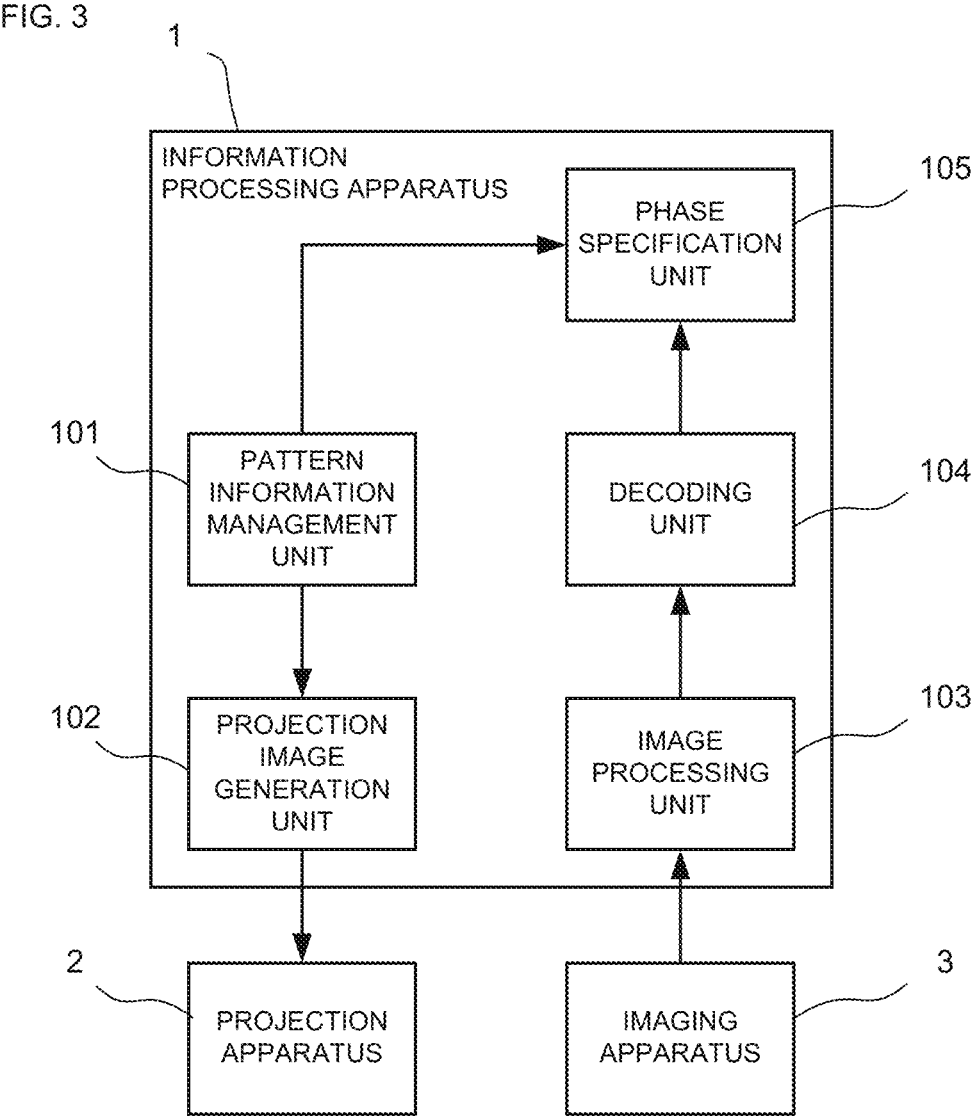
FIG. 3 is a block diagram showing a functional configuration of an information processing apparatus 1.

FIG. 3 is a block diagram showing a functional configuration of the information processing apparatus 1. As shown in the figure, the information processing apparatus 1 comprises a pattern information management unit 101, a projection image generation unit 102, an image processing unit 103, a decoding unit 104, and a phase specification unit 105.

The pattern information management unit 101 is configured to manage pattern information for generating a pattern to be projected by the projection apparatus 2, as well as manage a mapping function for specifying phase from a value decoded from the projected pattern. Details of the pattern information and the pattern will be described later.

The projection image generation unit 102 is configured to generate a projection image based on the pattern information managed by the pattern information management unit 101, i.e., the predetermined pattern information, and output the generated projection image to the projection apparatus 2. In some cases, shape of the object 200 is specified using two projection images, as described in detail below, in which case the projection image generation unit 102 is configured to generate a first projection image and a second projection image. The second projection image is an image in which brightness and darkness of the first projection image are reversed. Further, the projection image is configured to include a clock pattern and a data pattern based on the pattern information, and the clock pattern and the data pattern are arranged adjacent to each other. Specifically, the projection image has sequence of the clock pattern and sequence of the data pattern arranged alternately. The sequence of clock pattern and the sequence of data pattern are sequences of pattern in a certain direction. For example, if direction of the sequence of pattern is horizontal, the sequence is called row, and the projection image has row of clock pattern and row of data pattern arranged alternately, and if direction of the sequence of pattern is vertical, the sequence is called column, and the projection image has column of clock pattern and column of data pattern arranged alternately. The clock pattern and the data pattern may be configured with binary value of bright and dark or may be configured with multi-value by gradation.

The image processing unit 103 is configured to correct distortion of an captured image acquired from the imaging apparatus 3. The captured image is an image taken by the imaging apparatus 3 of an object on which a projection image is projected by the projection apparatus 2. The captured image acquired from the imaging apparatus 3 has distortion in a part corresponding to the projection image due to a positional relationship between the projection apparatus 2 and the imaging apparatus 3, and this is corrected. Specifically, parallelization processing is executed in such a manner that the part corresponding to the projection image becomes parallel. Note that image processing such as parallelization processing can be omitted. In the case where image processing by the image processing unit 103 is omitted, decoding by the decoding unit 104 is possible, but if image processing such as parallelization processing is executed, sequential memory access can be executed during decoding processing by the decoding unit 104, which can speed up processing.

The decoding unit 104 is configured to decode data pattern into a value based on the captured image that has been taken of an object by the imaging apparatus 3 and corrected by the image processing unit 103. The value is, for instance, a value represented in 8 bits. At this time, the decoding unit 104 is configured to decode the data pattern into the value based on a part of a first sequence of the data pattern, e.g., a part of a first row of the data pattern, and a part of a second sequence of the data pattern, e.g., a part of a second row of the data pattern. When two projection images are used to specify shape of the object 200, the decoding unit 104 is configured to decode the data pattern into the value based on a difference between an image taken of the object in a state where the first projection image is projected and an image taken of the object in a state where the second projection image is projected.

The phase specification unit 105 is configured to specify phase of each part of the object based on the value decoded by the decoding unit 104 and the pattern information managed by the pattern information management unit 101. Specifically, the pattern information management unit 101 is configured to manage a mapping function generated based on the pattern information, and the phase specification unit 105 is configured to input the value decoded by the decoding unit 104 to the mapping function to acquire phase. The mapping function may be configured as a look-up table, for instance.

Instead of the information processing apparatus 1, two or more information processing apparatuses can be applied. For example, when two information processing apparatuses are used, a first information processing apparatus shall comprise a pattern information management unit and a projection image generation unit. The pattern information management unit and the projection image generation unit correspond to the pattern information management unit 101 and the projection image generation unit 102, respectively. The second information processing apparatus shall comprise a pattern information management unit, an image processing unit, a decoding unit, and a phase specification unit. The pattern information management unit, the image processing unit, the decoding unit, and the phase specification unit correspond to the pattern information management unit 101, the image processing unit 103, the decoding unit 104, and the phase specification unit 105, respectively.

4. Pattern of Projection Image

Next, a pattern of the projection image generated by the projection image generation unit 102 will be described. In the following description, sequence of pattern is described as pattern row. Further, a case in which the pattern is configured of binary values of bright and dark and shape of the object 200 is specified using two projection images will be described here as well. The binary values configuring the pattern are, for example, bright and dark with different brightness levels. Difference in brightness is expressed as a difference in luminance in projection.

Figure 4:
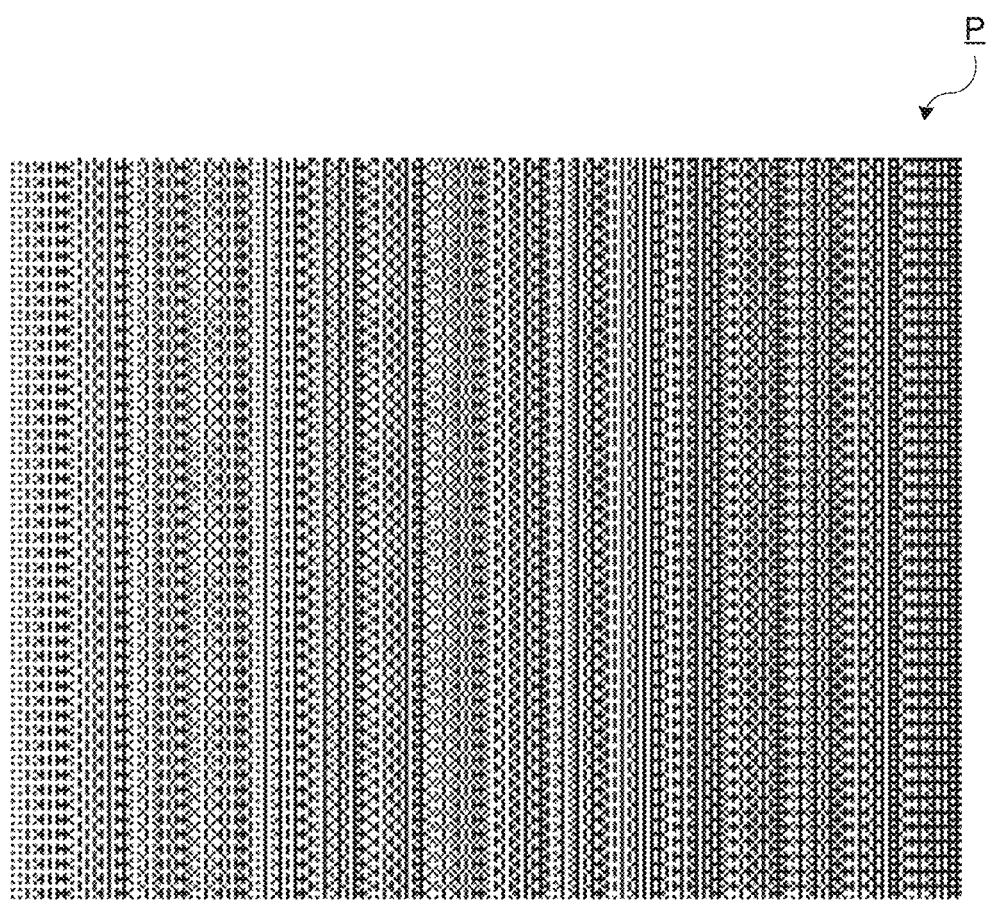
FIG. 4 is a diagram showing an example of a pattern of a projection image.

FIG. 4 is a diagram showing an example of a pattern in a projection image. A pattern P shown in the figure is configured of black and white binary values, and when projected by the projection apparatus 2, a bright and dark pattern will be generated on the object 200, etc.

Figure 5:
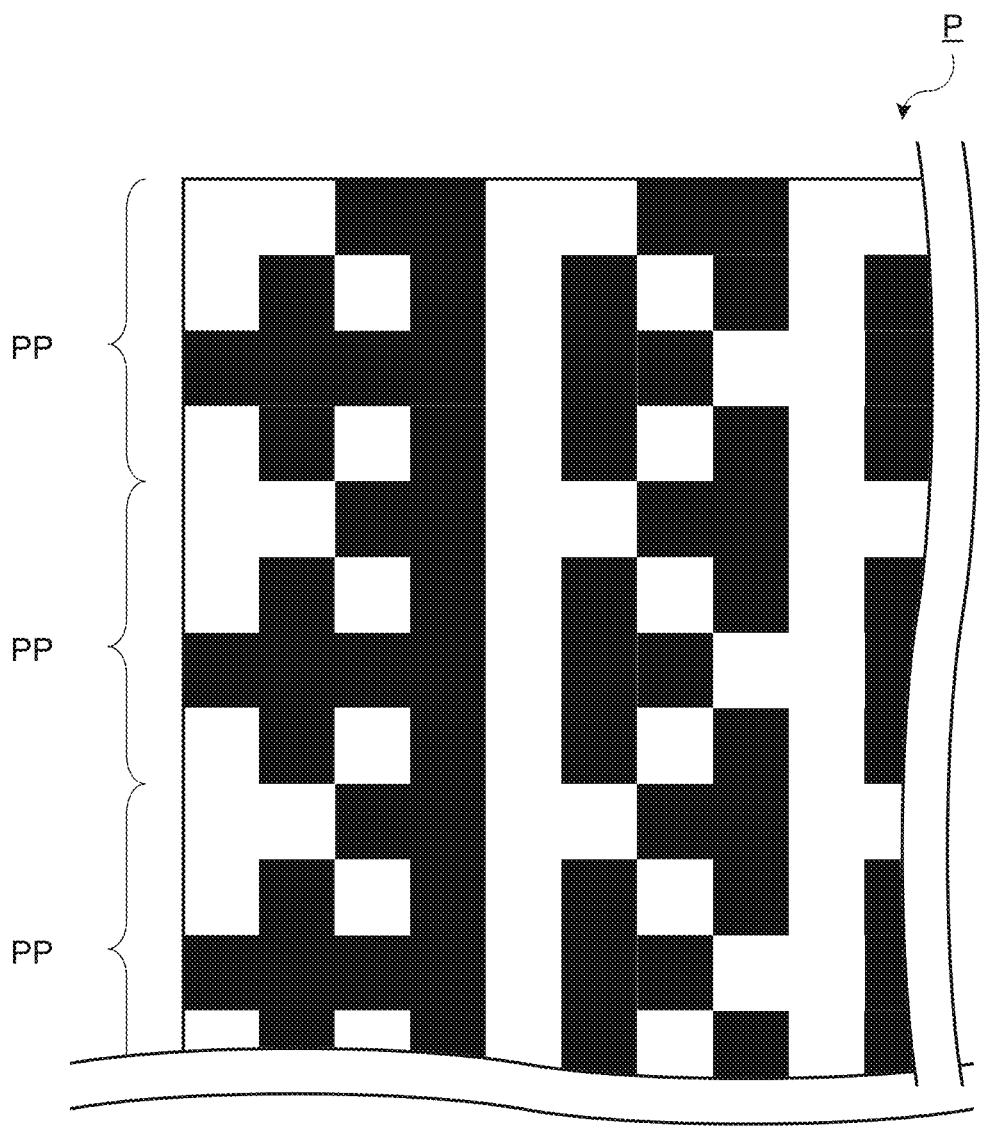
FIG. 5 is an enlarged view of a pattern P.

FIG. 5 is an enlarged view of the pattern P. As shown in the figure, the pattern P is configured of a plurality of pattern components PP, and the plurality of pattern components PP of the same pattern are repeatedly arranged.

Figure 6:
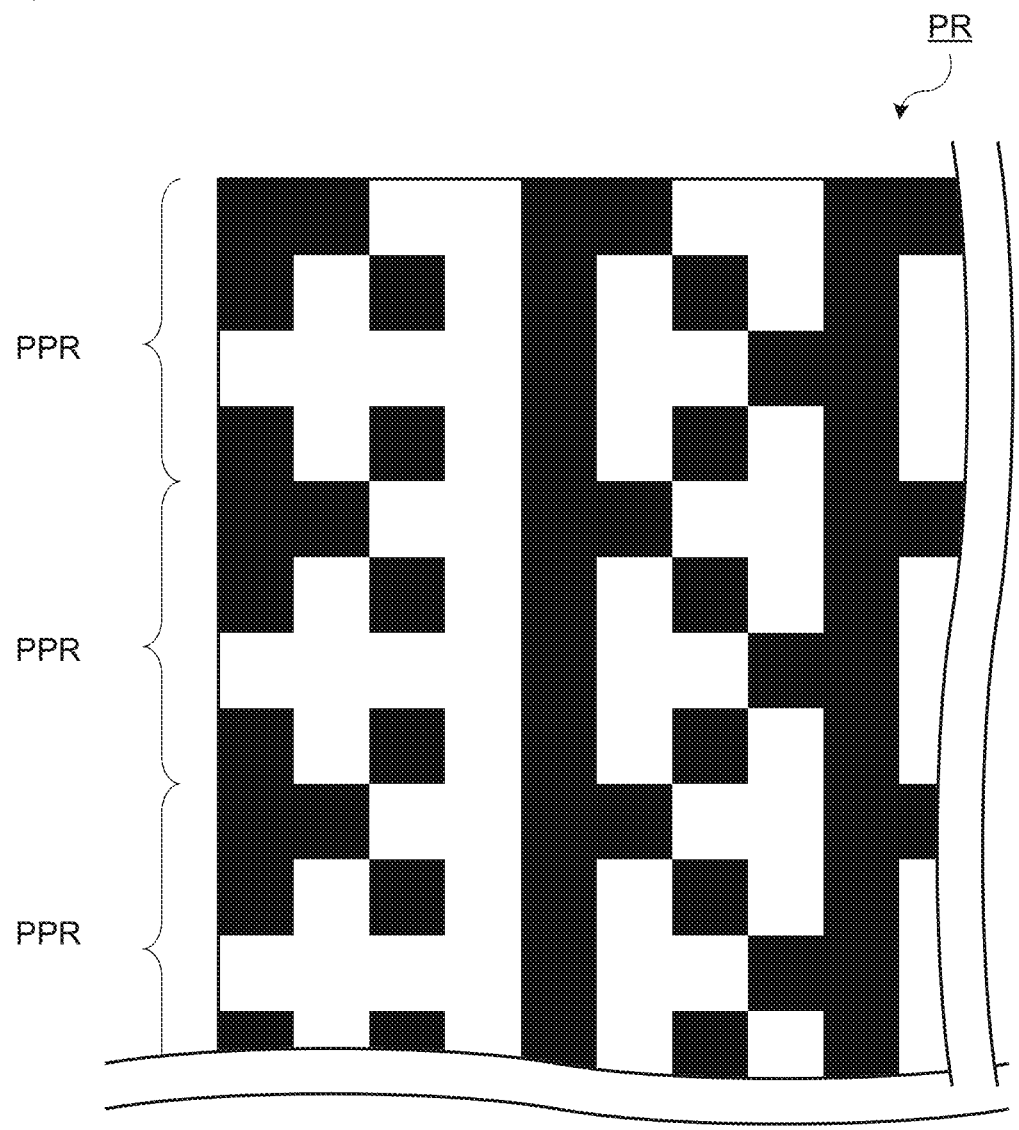
FIG. 6 is a diagram showing an example of a pattern PR.

When two projection images are used to specify shape of the object 200, another pattern PR is applied. FIG. 6 is a diagram showing an example of a pattern PR. As shown in the figure, the pattern PR is configured of pattern component PPR, and pattern components PPR of the same pattern are repeatedly arranged. As clarified by comparing FIG. 5 with FIG. 6, the pattern PR is a pattern in which white part of the pattern P is reversed to black and black part is reversed to white, and a pattern of bright and dark when projected by the projection apparatus 2 is reversed as well.

When specifying shape of the object 200 using two projection images, in the information processing apparatus 1, the decoding unit 104 obtains a difference between captured images corresponding to the two projection images, specifies data pattern from the difference, and decodes it into a value. For instance, if a bright part of a captured image is "1" and a dark part of the captured image is "0," the difference will be "1," "0," or "−1". Since the bright part in the pattern P is dark in the pattern PR, the difference is 1-0, which is "1," and since the dark part in the pattern P is bright in the pattern PR, the difference is 0-1, which is "−1." In addition, if a shadow is generated due to shape of the object 200, since the shadow part is dark in both a captured image when the pattern P is projected and a captured image when the pattern PR is projected, the difference between the parts becomes 0-0, which is "0."

Figure 7:
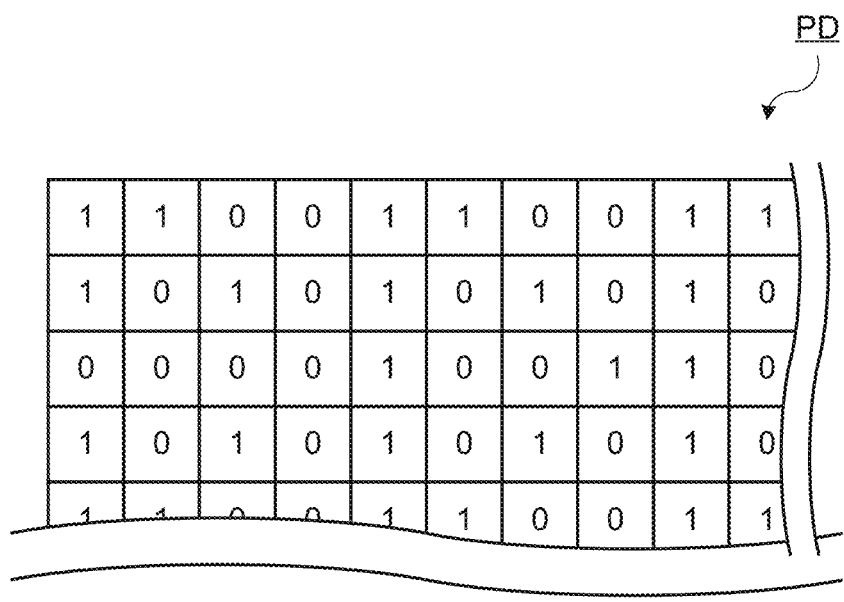
FIG. 7 shows a difference PD between a pattern P and a pattern PR.

Here, if the part where the difference is "1" is represented as "1" and the part where the difference is "−1" is represented as "0," the difference will be as shown in FIG. 7. FIG. 7 shows a difference PD between the pattern P and the pattern PR. The difference PD would be the same as that of the pattern P if no shadow caused by the object 200.

In addition, when specifying shape of the object 200 using one projection image, for instance, it is possible to project the pattern P and decode into a value by setting the bright part of the captured image as "1" and the dark part of the captured image as "0." Processing of specifying shape of the object 200 using one projection image is effective if the object 200 involves movement and the movement is fast.

Figure 8:
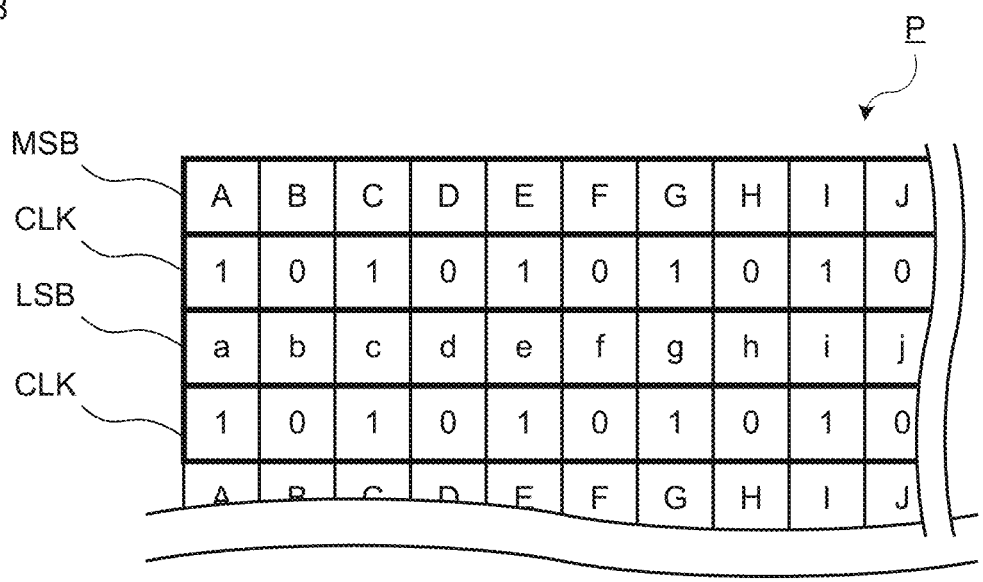
FIG. 8 is a diagram showing details of a pattern P.
Figure 9:
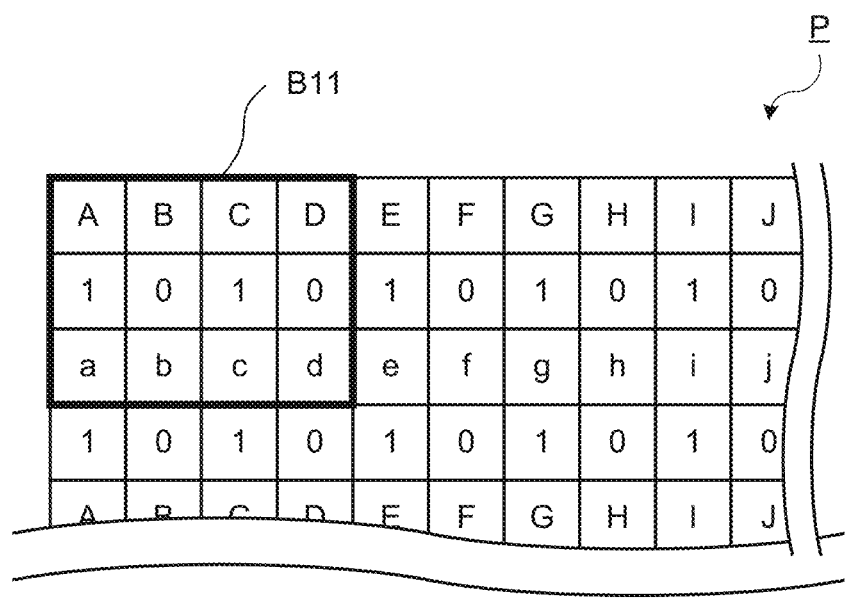
FIG. 9 is a diagram for illustrating decoding from a pattern P.
Figure 10:
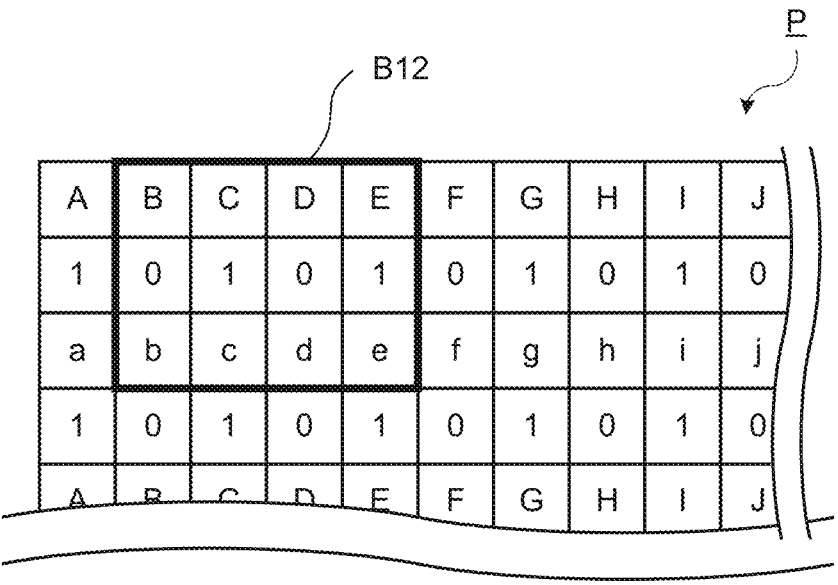
FIG. 10 is a diagram for illustrating decoding from a pattern P.

Here, details of the pattern P will be described. FIG. 8 is a diagram showing details of the pattern P. As shown in the figure, the pattern P includes an upper bit column MSB, which is part of a data pattern based on predefined pattern information, a lower bit column LSB, which is another part, and a clock pattern row CLK. The clock row is a row in which 1 and 0 are alternately arranged, and is a part used as a delimiter when 0 or 1 are consecutive in the upper bit column MSB and the lower bit column LSB. Note that "bit column" used here is a term and has a different meaning from pattern column. In addition, a part indicated by alphabet in the figure is 1 or 0, and the same alphabet is set to the same value. In the case of the example shown in FIG. 7, A=1, B=1, C=0, D=0, E=1, F=1, G=0, H=0, I=1, J=1, a=0, b=0, c=0, d=0, e=1, f=0, g=0, h=1, i=1, j=0.

Thus, the pattern P is a pattern code that represents information, in which the clock pattern and the data pattern are arranged adjacent to each other, and the row (sequence) of the clock pattern and the row (sequence) of the data pattern are arranged alternately. Note that arrangement of the data pattern can be determined arbitrarily, for instance, the upper bit column MSB and the lower bit column LSB in FIG. 8 may be arranged in reverse order, or odd bit can be arranged at a position indicated by the upper bit column MSB and even bit can be arranged at a position indicated by the lower bit column LSB in FIG. 8.

Note that the pattern P excluding the clock pattern, i.e., the data pattern, is De Bruijn torus sequence, which allows code indicating a single piece of information to be stacked in a staggered manner, and furthermore can be configured of a minimum of two rows, giving advantage that only a small area needs to be viewed to acquire phase.

Here, decoding from the pattern P will be described. FIGS. 9 to 12 illustrate decoding from the pattern P. Decoding from the pattern P is executed from a part of the upper bit column MSB, which is a first row of the data pattern, and a part of the lower bit column LSB, which is a second row of the data pattern. In other words, the pattern configures a code corresponding to a single value from a part of the first row of the data pattern and a part of the second row of the data pattern. Specifically, decoding involves acquiring 4 bits each from the upper bit column MSB and the lower bit column LSB, as in a pattern block B11 shown in FIG. 9, and combining the two to specify 8-bit value. Value of the pattern block B11 is "11000000," which is 192 in decimal. If a position of the pattern block B11 is represented by "0," then the above-mentioned mapping function would return "0" for input "192." Similarly, value of a pattern block B12 is "10010001" (145 in decimal) and value of a pattern block B13 is "00110010" (50 in decimal.) The mapping function described above will return "1" for input "145" and return "2" for input "50." Further, value of a pattern block B21 is "11000000", which is the same as the value of the pattern block B11.

Thus, as for the pattern P, a value can be assigned for each block of bright and dark in a horizontal direction in the figures, and a value can be assigned for each block of bright and dark in a vertical direction in the figures. In the examples shown in FIGS. 9 through 12, although ABCDabcd, BCDEbcde, CDEFcdef, DEFGdefg, etc. are each different values, since two or more such sequences exist, the pattern information management unit 101 manages which sequence to use. Note that when the sequence of pattern is configured as a pattern row, it is the same as a pattern row rotated 90 degrees.

Here, two examples of the sequence of value that can be used as the pattern P will be illustrated. In a first example, "0, 0, 0, 0, 0, 0, 0, 0, 0, 0, 0, 0, 0, 0, 0, 0, 0, 1, 0, 0, 0, 1, 0, 0, 0, 1, 0, 0, 0, 1, 0, 0, 0, 1, 0, 0, 0, 1, 0, 0, 0, 1, 0, 0, 0, 1, 0, 0, 0, 1, 0, 1, 0, 0, 0, 1, 0, 0, 0, 1, 0, 0, 0, 1, 0, 0, 0, 1, 0, 0, 0, 1, 0, 0, 0, 1, 0, 0, 0, 1, 1, 0, 0, 1, 1, 0, 0, 1, 1, 0, 0, 1, 1, 0, 0, 1, 1, 0, 0, 1, 0, 0, 0, 1, 1, 0, 0, 0, 1, 1, 0, 0, 1, 1, 0, 0, 1, 1, 0, 0, 1, 0, 1, 0, 1, 0, 1, 0, 1, 0, 1, 0, 1, 0, 0, 1, 1, 0, 0, 1, 1, 0, 0, 1, 0, 1, 0, 1, 0, 1, 0, 1, 0, 1, 0, 1, 0, 1, 0, 1, 0, 0, 1, 1, 0, 0, 1, 1, 1, 0, 0, 1, 1, 1, 0, 0, 1, 1, 0, 0, 1, 1, 1, 0, 0, 1, 1, 1, 0, 0, 1, 1, 1, 0, 0, 1, 1, 1, 0, 1, 1, 1, 0, 1, 1, 1, 0, 1, 1, 1, 0, 1, 1, 1, 0, 1, 1, 1, 0, 1, 1, 1, 1, 0, 1, 1, 1, 1, 0, 1, 1, 1, 1, 0, 1, 1, 1, 1, 0, 1, 1, 1, 1, 1, 1, 1" is arranged at a position indicated by the upper bit column MSB, and "0, 0, 0, 0, 1, 0, 0, 1, 1, 0, 1, 0, 1, 1, 1, 1, 0, 0, 0, 0, 1, 0, 0, 1, 1, 0, 1, 0, 1, 1, 1, 1, 0, 0, 0, 0, 1, 0, 0, 1, 1, 0, 1, 0, 1, 1, 1, 1, 0, 0, 0, 0, 1, 0, 0, 1, 1, 0, 1, 0, 1, 0, 1, 1, 1, 1, 0, 0, 0, 0, 1, 1, 1, 0, 0, 0, 0, 1, 0, 0, 1, 1, 0, 1, 0, 1, 1, 1, 1, 0, 0, 0, 0, 1, 0, 0, 1, 1, 0, 1, 0, 1, 1, 1, 1" is arranged at a position indicated by the lower bit column LSB in FIG. 8.

In a second example, "1, 1, 0, 0, 1, 1, 0, 0, 1, 1, 0, 0, 0, 1, 1, 0, 0, 1, 1, 0, 0, 1, 1, 0, 0, 1, 1, 0, 0, 1, 1, 0, 0, 1, 0, 1, 0, 1, 0, 1, 0, 1, 0, 1, 0, 1, 0, 1, 0, 1, 0, 1, 0, 1, 0, 1, 0, 1, 1, 0, 0, 1, 1, 1, 0, 0, 1, 1, 0, 0, 1, 1, 0, 0, 1, 1, 0, 0, 1, 1, 0, 1, 0, 1, 1, 1, 0, 0, 1, 1, 0, 0, 1, 1, 0, 0, 1, 1, 0, 0, 1, 1, 0, 0, 1, 0, 1, 0, 1, 0, 1, 0, 1, 0, 1, 1, 0, 1, 0, 1, 1, 1, 1, 0, 1, 1, 1, 1, 0, 1, 1, 1, 1, 0, 1, 1, 1, 1, 0, 1, 1, 1, 1, 0, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 0, 0, 0, 0, 0, 0, 0, 0, 0, 0, 0, 0, 0, 0, 0, 0, 0, 0, 1, 0, 0, 0, 0, 1, 0, 0, 0, 1, 0, 0, 0, 0, 1, 0, 0, 0, 1, 0, 0, 0, 0, 1, 0, 0, 0, 1, 0, 0, 0, 1, 0, 0, 0, 1, 0, 0, 0, 1, 0, 1, 0, 0, 0, 1, 0, 0, 0, 1, 0, 0" is arranged at a position indicated by the upper bit column MSB, and "0, 0, 0, 0, 1, 0, 0, 1, 1, 0, 1, 0, 1, 1, 1, 1, 0, 0, 0, 0, 1, 0, 0, 1, 1, 0, 1, 0, 1, 1, 1, 1, 0, 0, 0, 0, 1, 1, 1, 1, 0, 0, 0, 0, 1, 0, 0, 1, 1, 0, 1, 0, 0, 1, 1, 0, 1, 0, 1, 1, 1, 1, 0, 0, 0, 0, 1, 0, 0, 1, 1, 1, 1, 0, 0, 0, 1, 0, 0, 1, 1, 0, 1, 0, 1, 1, 1, 1, 0, 0, 0, 0, 1, 0, 0, 1, 1, 0, 1, 0, 1, 0, 1, 1, 1, 1, 1, 0, 0, 0, 0, 1, 0, 0, 1, 1, 0, 0, 1, 1, 0, 1, 0, 1, 1, 1, 1, 0, 0, 0, 0, 1, 0, 1, 0, 1, 1, 1, 1, 0, 0, 0, 0, 1, 0, 0, 1, 1, 0, 1, 0, 1, 0, 1, 1, 1, 0, 0, 0, 0, 1, 0, 0, 1, 1, 1, 1, 0, 0, 0, 0, 1, 0, 1, 0, 1, 1, 1, 1, 1, 0, 0, 0, 0, 1, 0, 0, 1, 1, 0, 1, 0, 1, 0, 1, 1, 1, 1" is arranged at a position indicated by the lower bit column LSB in FIG. 8.

5. Operation of Information Processing Apparatus 1

Figure 13:
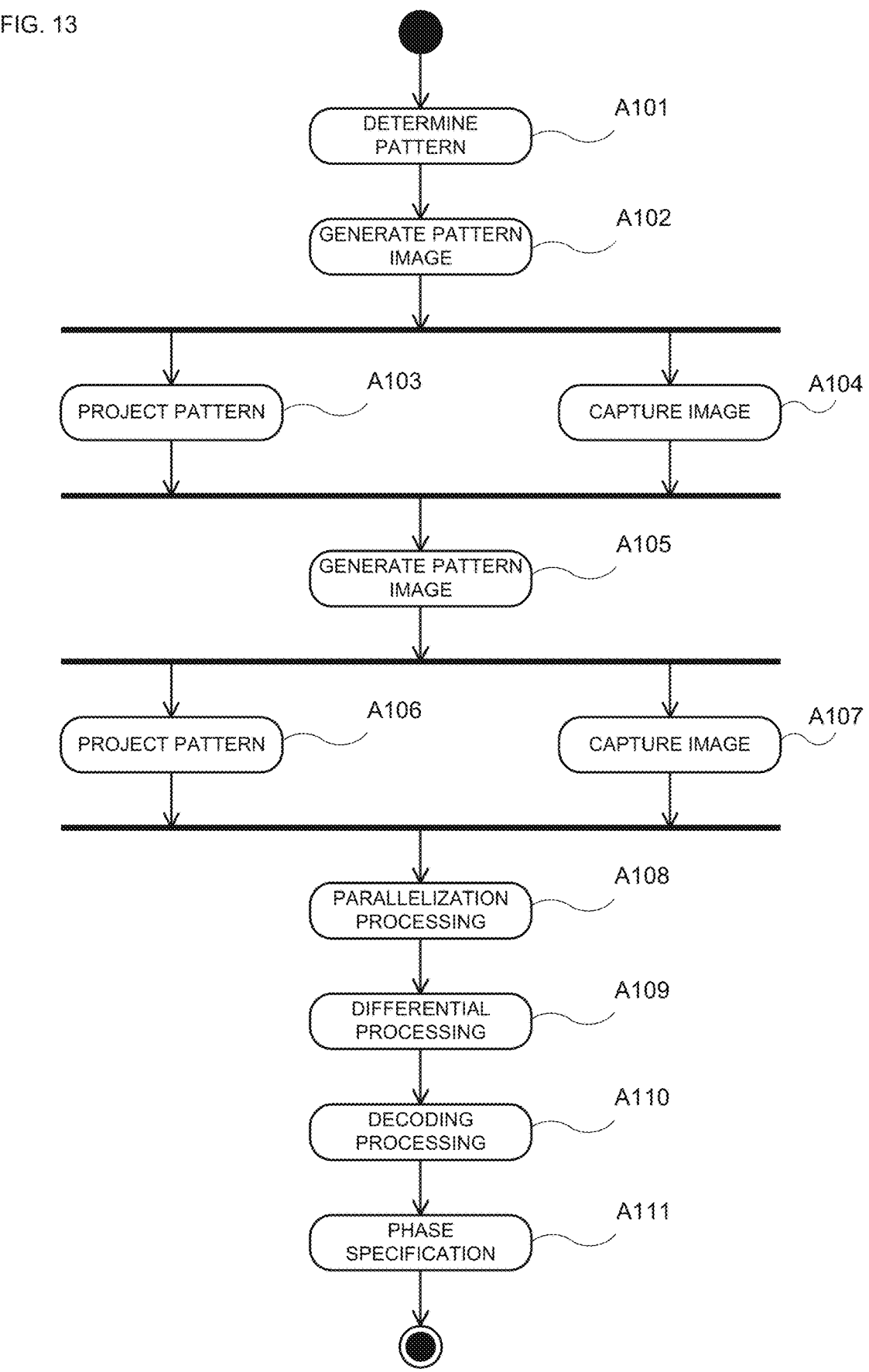
FIG. 13 is an activity diagram showing a flow of operation of an information processing apparatus 1.

Next, an operation flow of the information processing apparatus 1 will be described. FIG. 13 is an activity diagram showing the operation flow of the information processing apparatus 1.

In the information processing apparatus 1, the projection image generation unit 102 first determines pattern information to be used from the pattern information managed in the pattern information management unit 101 (A101). This processing can be omitted if a single piece of pattern information is applied. The projection image generation unit 102 then generates a pattern image based on the determined pattern information (A102) and outputs it to the projection apparatus 2.

Figure 14:
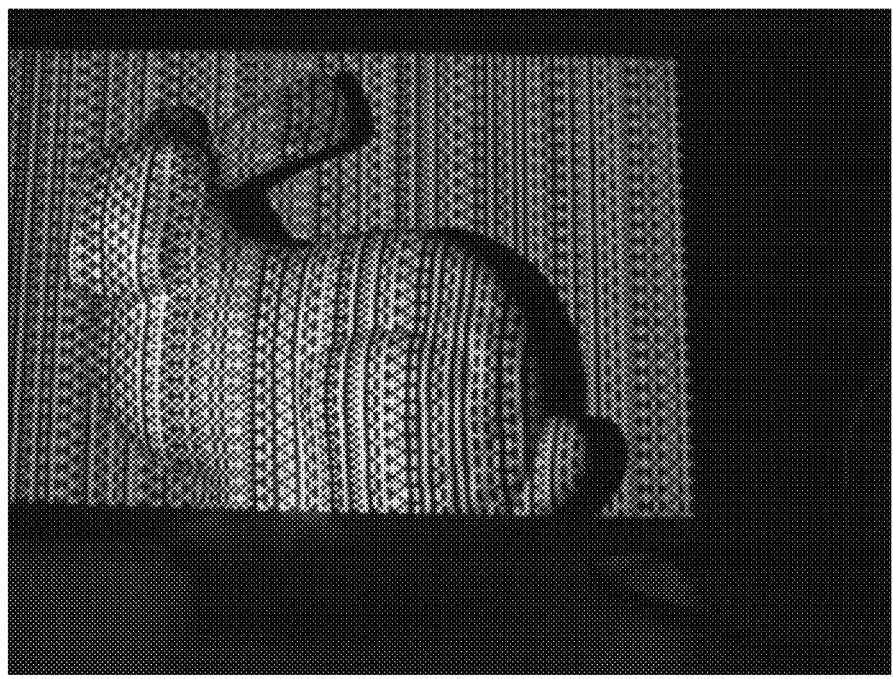
FIG. 14 is a diagram showing an example of a captured image.

When the pattern image is output to the projection apparatus 2, the projection apparatus 2 projects the pattern image onto the object 200 (A103). Then, while the pattern image is being projected onto the object 200, the imaging apparatus 3 captures an image of the object 200 (A104). The captured image taken at this time is, for instance, as shown in FIG. 14.

Figure 15:
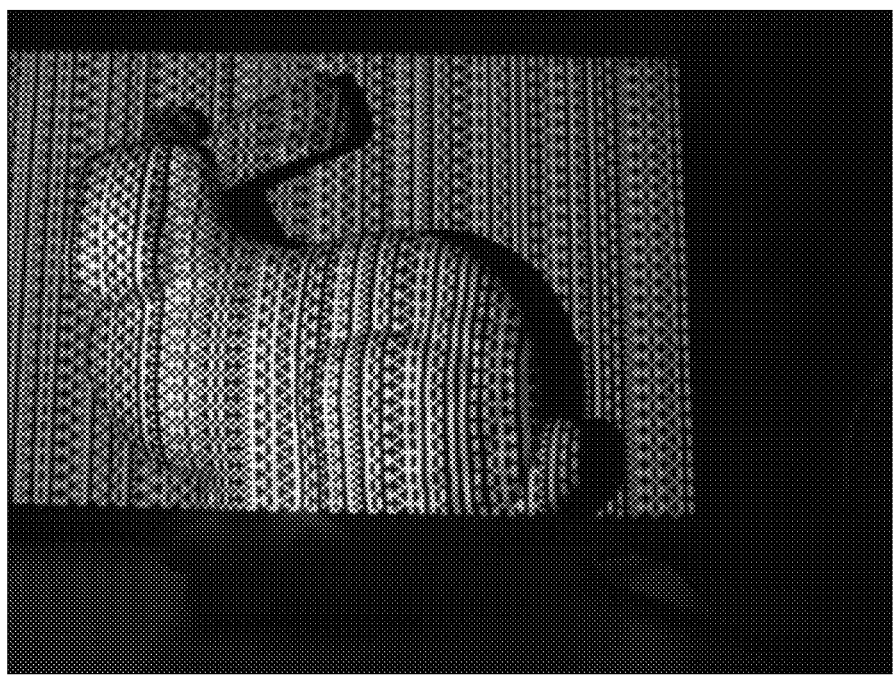
FIG. 15 is a diagram showing an example of a captured image.

Next, the projection image generation unit 102 generates a pattern image that is a reversed version of the previously used pattern image (A105) and outputs it to the projection apparatus 2. When the pattern image is output to the projection apparatus 2, the projection apparatus 2 projects the pattern image onto the object 200 (A106). Then, with the pattern image projected onto the object 200, the imaging apparatus 3 captures an image of the object 200 (A107). The captured image taken at this time is, for example, as shown in FIG. 15.

Figure 16:
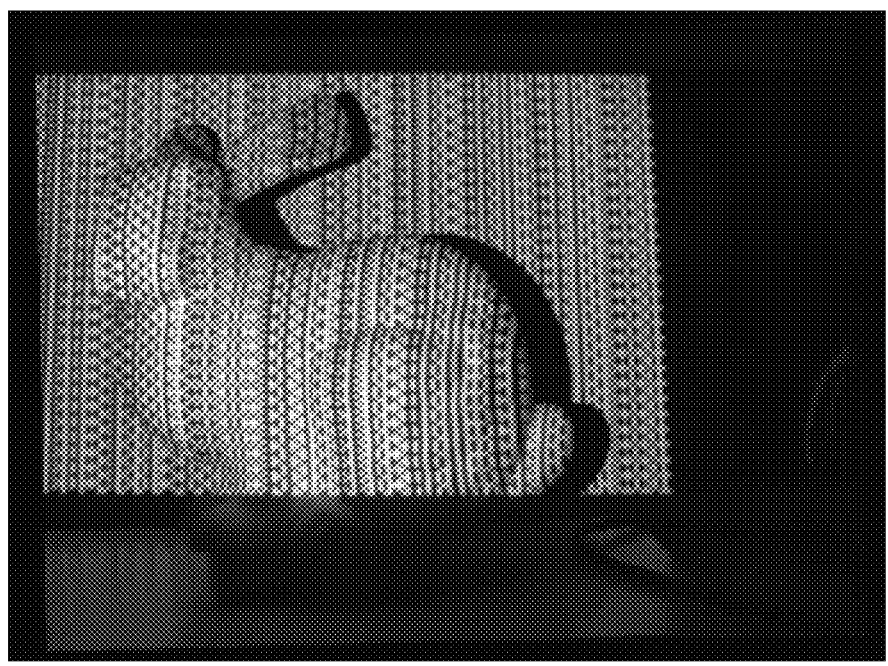
FIG. 16 is a diagram showing an example in which a captured image is parallelized.
Figure 17:
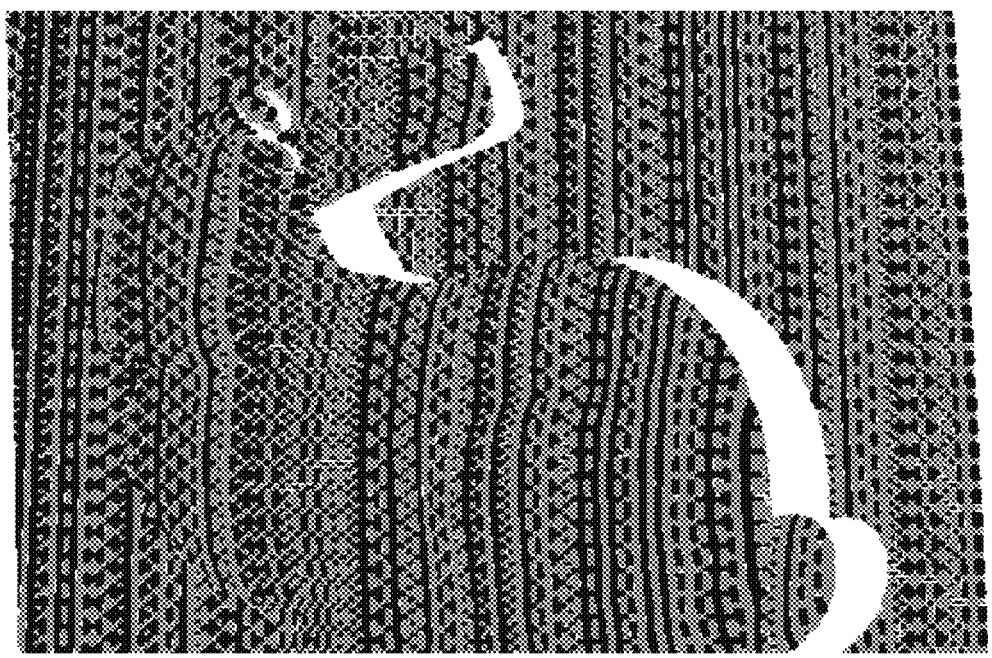
FIG. 17 is a diagram showing calculated difference as an image.

Then, the image processing unit 103 executes parallelization processing of the captured image (A108). A parallelized version of the captured image shown in FIG. 14 is, for example, as shown in FIG. 16. Then, the decoding unit 104 calculates a difference between two images (A109). The calculated difference, represented as an image, is shown in FIG. 17. In FIG. 17, a part where the difference is "1" is represented in gray, a part where the difference is "−1" is represented in black, and a part where the difference is "0," i.e., the shadow part, is represented in white.

Subsequently, the decoding unit 104 executes decoding processing based on the calculated difference (A110), and the phase specification unit 105 inputs the decoded value to the mapping function managed by the pattern information management unit 101 to specify phase (A111).

Note that the operation flow described here is merely an example.

6. Variation 1

Variation 1 is an example in which the projection image generation unit 102 generates a projection image that takes lens distortion into consideration. In the system 100 shown in FIG. 1, lenses are used in both the projection apparatus 2 and the imaging apparatus 3. Although these lenses are processed to reduce distortion, they cannot eliminate effect of distortion completely. Further, although the projection apparatus 2 can project image in which the effect of lens distortion is removed by performing adjustment, it may be difficult to remove the effect of distortion in lens of the imaging apparatus 3.

Figure 18:
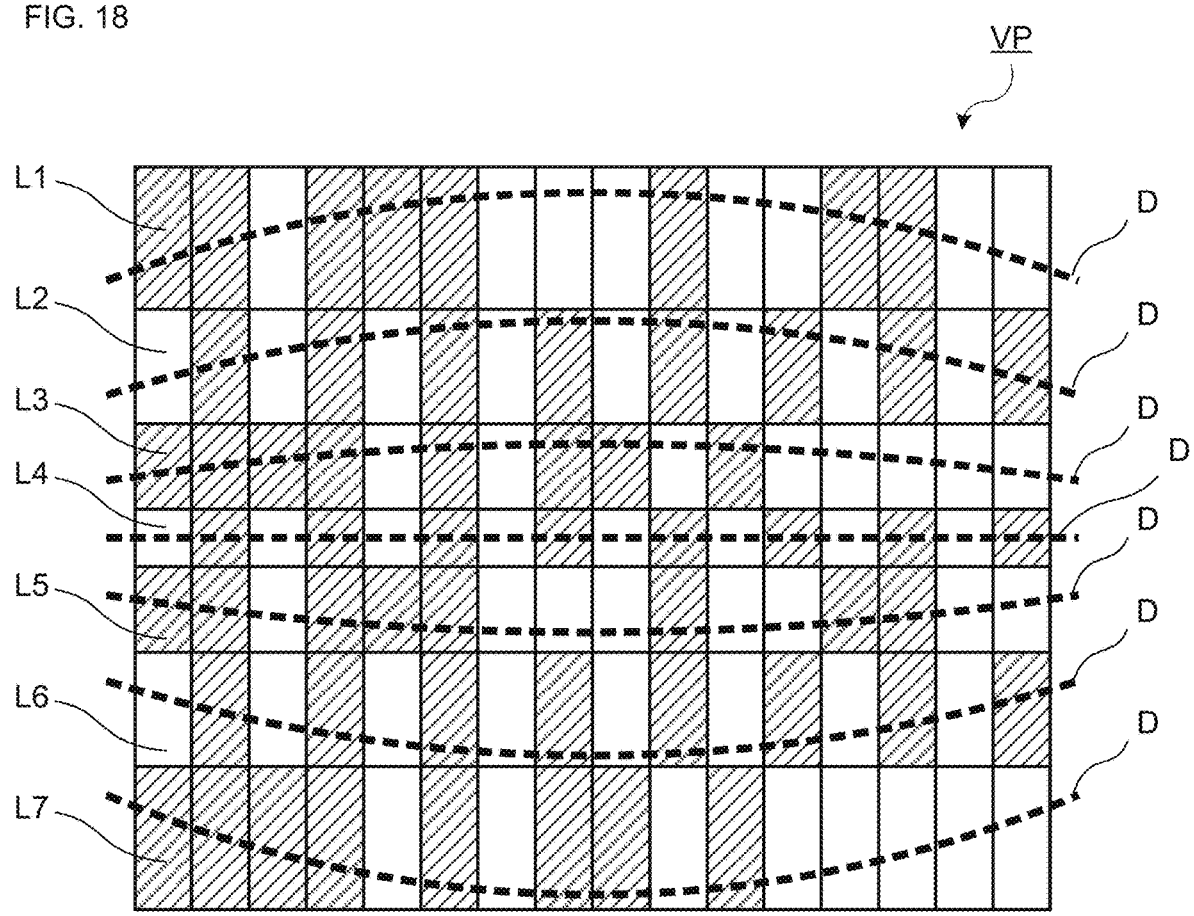
FIG. 18 is a diagram showing an example of a pattern that takes influence of lens distortion into consideration.

Therefore, the projection image generated by the projection image generation unit 102 is shown in FIG. 18. FIG. 18 shows an example of a pattern that takes the effect of lens distortion into consideration. In the figure, bright area of the pattern is shown in white (blank) and dark area is shown in diagonal line. The pattern VP shown in FIG. 18 includes rows L1 to L7. Among these, row L2, row L4, and row L6 are clock pattern rows, and row L1, row L3, row L5, and row L7 are data pattern rows. In other words, in the pattern VP, the clock pattern and the data pattern may be configured as row of the projection image. Of course, the clock pattern and the data pattern may be configured as column of the projection image. Width of each row or column increases as the row or the column moves away from center of the projection image. In the example shown in FIG. 18, row L4 is a row through center of the pattern VP, widths of row L3 and row L5 are wider than row L4, widths of row L2 and row L6 are even wider, and widths of row L1 and row L7 are the widest in the pattern VP. The widths of these rows correspond to lens distortion indicated by dashed line D in the figure. Note that the dashed line D is added for the purpose of explanation and does not configure the pattern VP. Furthermore, FIG. 18 is for illustration only, and width of rows or number of patterns is different from actual ones.

7. Variation 2

Variation 2 projects only one pattern and performs decoding from one captured image without calculating the difference. In this case, although error may occur in shadow part, the error can be avoided by using an error correction code or the like.

8. Variation 3

Figure 19:
FIG. 19 is a diagram showing an example of expanding a pattern in a spatial direction.

Variation 3 is an extension of the projected pattern in a spatial direction. FIG. 19 shows an example of extending the pattern in the spatial direction. The example shown in the figure is an inversion of the clock pattern row CLK of the pattern shown in FIG. 8.

9. Variation 4

Figure 20:
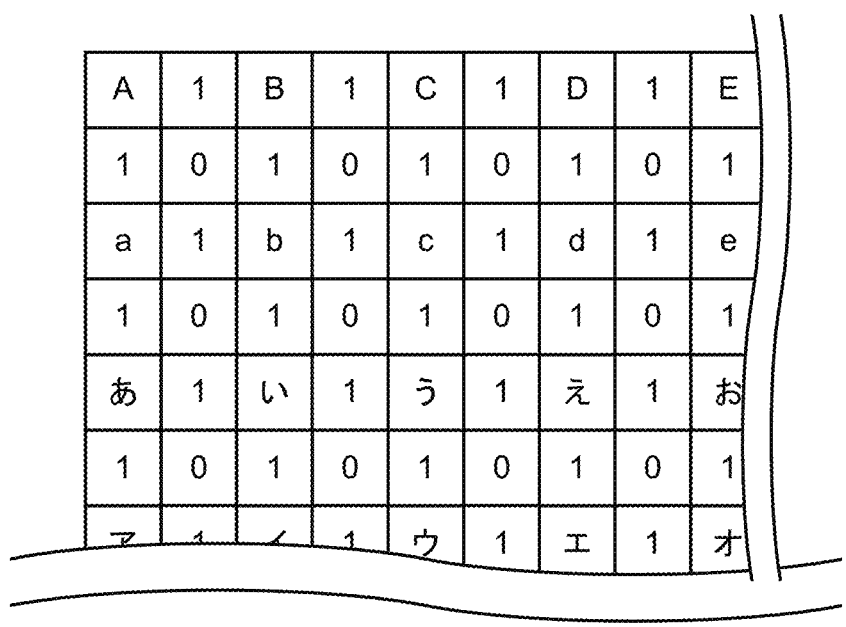
FIG. 20 is a diagram showing an example of expanding a pattern in a spatial direction.

Variation 4 is an extension of the projected pattern in a spatial direction. FIG. 20 shows an example of extending the pattern in the spatial direction. The example shown in the figure uses clock pattern column in addition to clock pattern row.

10. Variation 5

Variation 5 is an extension of the projected pattern in a time direction. This is performed by sequentially projecting two or more different patterns and decoding from two or more captured images.

11. Variation 6

Variation 6 is an extension of the projected pattern in a gradation direction. This means that the pattern is not binary but is configured of multi-value using gradation representation. The gradation is represented, for instance, by multi-level of different brightness.

12. Variation 7

Variation 7 is an extension of the projected pattern in a wavelength direction. This is performed, for example, by projecting a pattern corresponding to each RGB color in each color and separating the captured image into each color, for example, from a binary value of 8 bits to a value of 24 bits. Further, in combination with variation 6, gradation representation may be applied for each RGB color.

13. Variation 8

In variation 8, clock pattern includes a clock inversion location, and number of patterns in the projection image is increased. In the case of this variation 8, as for the clock pattern, width of the clock pattern at the inversion point or the data pattern adjacent to the inversion point differs from others.

FIGS. 21 and 22 are diagrams showing examples of pattern including clock inversion. In the example shown in FIG. 21, width of the pattern configuring clock pattern row CLK is narrower than other parts in an inversion point 11 of the clock pattern row CLK. Further, in the example shown in FIG. 22, width of the pattern configuring upper bit column MSB and lower bit column LSB is wider than other parts in an inversion point 12 of the clock pattern row CLK. Therefore, in both the inversion point 11 and the inversion point 12, the upper bit column MSB and the lower bit column LSB are unaligned with the clock pattern row CLK. Although the example shown in FIG. 21 and the example shown in FIG. 22 can be used in the same way, depending on resolution of the projection apparatus 2 and the imaging apparatus 3, for instance, it may be difficult to realize the pattern shown in FIG. 21, in which case the pattern shown in FIG. 22 is used.

FIG. 23 illustrates details of pattern including clock inversion. FIG. 23 is a diagram for explaining details of a pattern including clock inversion. In the example shown in FIG. 23, there are n patterns (n is a natural number) of pattern P1, pattern P2, pattern P3, . . . pattern Pn before the inversion point 12 (on left side in the figure), and there are n patterns of pattern Pn+1, pattern Pn+2, pattern Pn+3, . . . pattern P2n after 12 (on right side in the figure). In other words, by inverting the clock, number of patterns is doubled. This is because number of bits increases by 1 by adding any one bit of the clock pattern row CLK in addition to the pattern configured by the upper bit column MSB and the lower bit column LSB. Specifically, for example, if one bit of the most recently detected clock pattern row CLK is added to beginning of the upper bit column MSB and there are 8 bits in the upper bit column MSB and the lower bit column LSB, 1 bit of the clock pattern row CLK is interpreted as 9th bit.

In the case of pattern including clock inversion, the number of patterns increases, thus even if the inversion point 12 of the clock itself cannot be detected due to shadowing, for example, there is no obstacle because the detected pattern itself can be identified. In the example shown in FIG. 23, pattern P1 and pattern Pn+1 are the same pattern, but they are not adjacent and the patterns located between them are different, thus there is no practical difficulty in distinguishing them.

14. Other

Such processing enables specification of position in pattern when using structured light at a relatively high speed, and improvement in processing speed is especially noticeable when parallelization process is performed. Further, the described pattern of structured light also contributes to higher information density because the number of codes required for decoding is small and spatially superimposed. In addition, when the pattern is configured of binary value, the decoding process or the like is faster than when the pattern is configured of non-binary value because of high affinity of computer, etc., that process binary number.

The invention may be provided in each of following aspects.

(1) An information processing apparatus, comprising: a projection image generation unit configured to generate a projection image based on predetermined pattern information and output the generated projection image to a projection apparatus, the projection image including a clock pattern and a data pattern based on the pattern information; a decoding unit configured to decode the data pattern into a value based on a captured image taken of an object by an imaging apparatus, the captured image being an image taken of the object in a state where the projection image is projected by the projection apparatus; and a phase specification unit configured to specify phase of each part of the object based on the value and the pattern information.

(2) The information processing apparatus according to (1), wherein: the projection image has the clock pattern and the data pattern arranged adjacent to each other.

(3) The information processing apparatus according to (2), wherein: the projection image has sequence of the clock pattern and sequence of the data pattern arranged alternately.

(4) The information processing apparatus according to (3), wherein: the decoding unit is configured to decode the data pattern into a value based on a part of first sequence of the data pattern and a part of second sequence of the data pattern.

(5) The information processing apparatus according to (2) or (3), wherein: the clock pattern and the data pattern are configured as row or column of the projection image, and width of each of the row or the column increases as the row or the column moves away from center of the projection image.

(6) The information processing apparatus according to any one of (1) to (5), wherein: the clock pattern includes an inversion point of clock, and width of a clock pattern at the inversion point or a data pattern adjacent to the inversion point is different from others.

(7) The information processing apparatus according to any one of (1) to (6), wherein: the clock pattern and the data pattern are configured of binary value of bright and dark.

(8) The information processing apparatus according to (7), wherein: the projection image generation unit is configured to generate a first projection image and a second projection image, the second projection image being an image in which brightness and darkness of the first projection image are reversed, and the decoding unit is configured to decode the data pattern into the value based on a difference between an image taken of the object in a state where the first projection image is projected and an image taken of the object in a state where the second projection image is projected.

(9) The information processing apparatus according to any one of (1) to (6), wherein: the clock pattern and the data pattern are configured of multi-value by gradation.

(10) The information processing apparatus according to any one of (1) to (9), comprising: an image processing unit configured to correct distortion of the captured image.

(11) The information processing apparatus according to any one of (1) to (10), wherein: the data pattern is De Bruijn torus sequence.

(12) An information processing apparatus, comprising: a projection image generation unit configured to generate a projection image based on predetermined pattern information and output the generated projection image to a projection apparatus, wherein the projection image includes a clock pattern and a data pattern based on the pattern information, and the clock pattern and the data pattern are arranged adjacent to each other.

(13) An information processing apparatus, comprising: a decoding unit configured to decode a data pattern into a value based on a captured image taken of an object captured by an imaging apparatus, the captured image being an image taken of the object in a state where a projection image generated based on predetermined pattern information is projected, and the projection image including a clock pattern and a data pattern based on the pattern information; and a phase specification unit configured to specify phase of each part of the object based on the value and the pattern information.

(14) A program that allows a computer to operate as an information processing apparatus, wherein: the program allows a computer to function as the information processing apparatus according to any one of claims 1 to 13.

(15) A pattern code representing information, comprising: a clock pattern and a data pattern based on predetermined pattern information, wherein the clock pattern and the data pattern are arranged adjacent to each other.

(16) The pattern code according to (15), wherein: sequence of the clock pattern and sequence of the data pattern are arranged alternately.

(17) The pattern code according to (16), wherein: a part of first sequence of the data patterns and a part of second sequence of the data pattern configure a sign corresponding to a single value.

(18) The pattern code according to any one of (15) to (17), used in a structured light method.

Of course, the present invention is not limited thereto.

REFERENCE SIGNS LIST

1: Information processing apparatus
2: Projection apparatus
3: Imaging apparatus
11: Processing unit
12: Storage unit
13: Temporary storage unit
14: External apparatus connection unit
15: Communication unit
16: Communication bus
100: System
101: Pattern information management unit
102: Projection image generation unit
103: Image processing unit 104: Decoding unit
105: Phase specification unit
200: Object
B11: Pattern block
B12: Pattern block
B13: Pattern block
B21: Pattern block
CLK: Clock pattern row
D: Dashed line
11: Inversion point
12: Inversion point
L1: Row
L2: Row
L3: Row
LA: Row
L5: Row
L6: Row
L7: Row
LSB: Lower bit column
MSB: Upper bit column
P: Pattern
PD: Difference
P1: Pattern
P2: Pattern
P3: Pattern
Pn: Pattern
Pn+1: Pattern
Pn+2: Pattern
Pn+3: Pattern
P2$n$: pattern
PP: Pattern component
PPR: pattern component
PR: Pattern
VP: Pattern

What is claimed is:

1. An information processing apparatus, comprising:
a memory configured to store a program; and
a processor configured to execute the program so as to:
generate a projection image based on predetermined pattern information and output the generated projection image to a projection apparatus, the projection image including a clock pattern and a data pattern based on the pattern information;
decode the data pattern into a value based on a captured image taken of an object by an imaging apparatus, the captured image being an image taken of the object in a state where the projection image is projected by the projection apparatus; and
specify phase of each part of the object based on the value and the pattern information,
wherein the data pattern is a De Bruijn torus sequence.

2. The information processing apparatus according to claim 1, wherein:
the projection image has the clock pattern and the data pattern arranged adjacent to each other.

3. The information processing apparatus according to claim 2, wherein:
the projection image has sequence of the clock pattern and sequence of the data pattern arranged alternately.

4. The information processing apparatus according to claim 3, wherein the processor is configured to execute the program so as to:
decode the data pattern into a value based on a part of first sequence of the data pattern and a part of second sequence of the data pattern.

5. The information processing apparatus according to claim 2, wherein:
the clock pattern and the data pattern are configured as row or column of the projection image, and
width of each of the row or the column increases as the row or the column moves away from center of the projection image.

6. The information processing apparatus according to claim 1, wherein:
the clock pattern includes an inversion point of clock, and
width of a clock pattern at the inversion point or a data pattern adjacent to the inversion point is different from others.

7. The information processing apparatus according to claim 1, wherein:
the clock pattern and the data pattern are configured of binary value of bright and dark.

8. The information processing apparatus according to claim 7, wherein the processor is configured to execute the program so as to:
generate a first projection image and a second projection image, the second projection image being an image in which brightness and darkness of the first projection image are reversed, and
decode the data pattern into the value based on a difference between an image taken of the object in a state where the first projection image is projected and an image taken of the object in a state where the second projection image is projected.

9. The information processing apparatus according to claim 1, wherein:
the clock pattern and the data pattern are configured of multi-value by gradation.

10. The information processing apparatus according to claim 1, wherein the processor is configured to execute the program so as to:
correct distortion of the captured image.

11. An information processing apparatus, comprising:
a memory configured to store a program; and
a processor configured to execute the program so as to:
generate a projection image based on predetermined pattern information and output the generated projection image to a projection apparatus, wherein
the projection image includes a clock pattern and a data pattern based on the pattern information, and the clock pattern and the data pattern are arranged adjacent to each other.

12. An information processing apparatus, comprising:
a memory configured to store a program; and
a processor configured to execute the program so as to:
decode a data pattern into a value based on a captured image taken of an object captured by an imaging apparatus, the captured image being an image taken of the object in a state where a projection image generated based on predetermined pattern information is projected, and the projection image including a clock pattern and a data pattern based on the pattern information, and; and
specify phase of each part of the object based on the value and the pattern information,
wherein the data pattern is a De Bruijn torus sequence.

13. A non-transitory computer readable media storing a program that allows a computer to operate as an information processing apparatus, wherein:
the program allows a computer to function as the information processing apparatus according to claim 1.

14. A pattern code representing information, comprising:
a clock pattern and a data pattern based on predetermined pattern information, wherein the clock pattern and the data pattern are arranged adjacent to each other.

15. The pattern code according to claim 14, wherein:
sequence of the clock pattern and sequence of the data pattern are arranged alternately.

16. The pattern code according to claim 15, wherein:
a part of first sequence of the data patterns and a part of second sequence of the data pattern configure a sign corresponding to a single value.

17. The pattern code according to claim 14, used in a structured light method.

* * * * *